US008893113B1

(12) United States Patent
Nguyen

(10) Patent No.: US 8,893,113 B1
(45) Date of Patent: Nov. 18, 2014

(54) SIMULTANEOUS OPERATION OF A NETWORKED DEVICE USING MULTIPTLE DISPARATE NETWORKS

(75) Inventor: Kevin V. Nguyen, Allen, TX (US)

(73) Assignee: Open Invention Network, LLC, Durham, NC (US)

( * ) Notice: Subject to any disclaimer, the term of this patent is extended or adjusted under 35 U.S.C. 154(b) by 431 days.

(21) Appl. No.: 13/159,506

(22) Filed: Jun. 14, 2011

Related U.S. Application Data

(60) Provisional application No. 61/354,326, filed on Jun. 14, 2010.

(51) Int. Cl.
G06F 9/44 (2006.01)
G06F 9/445 (2006.01)

(52) U.S. Cl.
USPC ............ 717/173; 717/168; 717/171; 717/177

(58) Field of Classification Search
CPC ...... G06F 8/20–8/34; G06F 8/61; G06F 8/65; G06F 8/71
See application file for complete search history.

(56) References Cited

U.S. PATENT DOCUMENTS

| 7,027,425 | B1 * | 4/2006 | Fullerton et al. | 370/338 |
| 7,529,816 | B2 * | 5/2009 | Hayden et al. | 709/220 |
| 7,930,692 | B2 * | 4/2011 | Compas et al. | 717/171 |
| 8,151,259 | B2 * | 4/2012 | Fadell | 717/173 |
| 8,386,621 | B2 * | 2/2013 | Park et al. | 709/228 |
| 2001/0037453 | A1 * | 11/2001 | Mitty et al. | 713/168 |
| 2003/0229712 | A1 * | 12/2003 | Thayer et al. | 709/236 |
| 2007/0169087 | A1 * | 7/2007 | Fadell | 717/168 |
| 2009/0276771 | A1 * | 11/2009 | Nickolov et al. | 717/177 |
| 2010/0287274 | A1 * | 11/2010 | Martinez et al. | 709/224 |
| 2011/0225302 | A1 * | 9/2011 | Park et al. | 709/227 |

OTHER PUBLICATIONS

Kalogridis et al., Connection availability and transient survivability analysis in wireless ad-hoc networks, Oct. 2009, 8 pages.*
Gerstel et al., A general framework for service availability for bandwidth-efficient connection-oriented networks, Jun. 2010, 11 pages.*

* cited by examiner

Primary Examiner — Thuy Dao
(74) Attorney, Agent, or Firm — Haynes and Boone, LLP

(57) ABSTRACT

In a typical network setup, a networked capable device interfaces to either one wired network hub or to a wireless network hub. The networked capable device will send and receive data packets to and from the wired or wireless hub it is connected to. The invention provides a system, method and a computer program to send and receive data packets to and from multiple wired and/or wireless network hubs in order to, for example, increase the number of data packets the networked capable device can receive to multiple applications run on the networked capable device.

11 Claims, 10 Drawing Sheets

OSI Model with the Routing Program

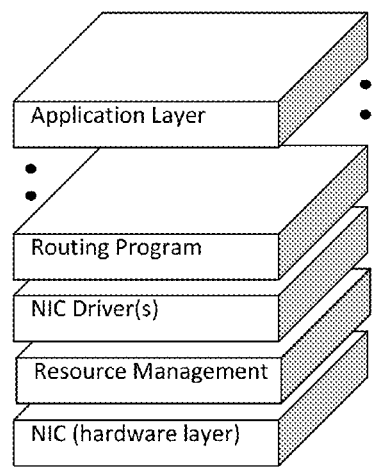
FIGURE 2 - Typical Operating System Layers with Routing Program

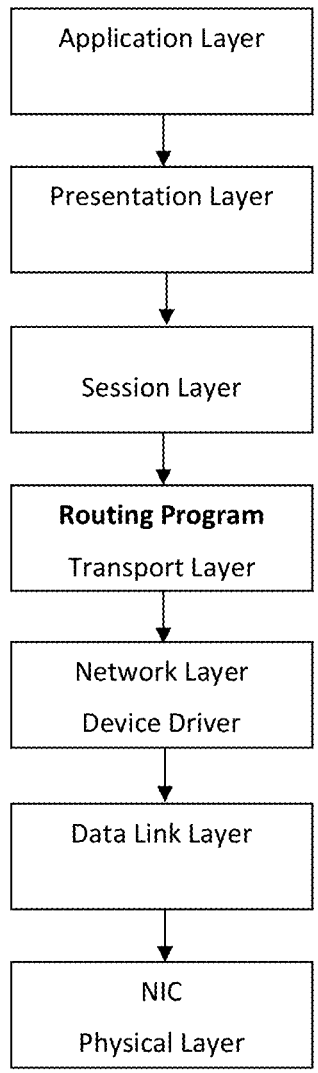
FIGURE 3 - OSI Model with the Routing Program

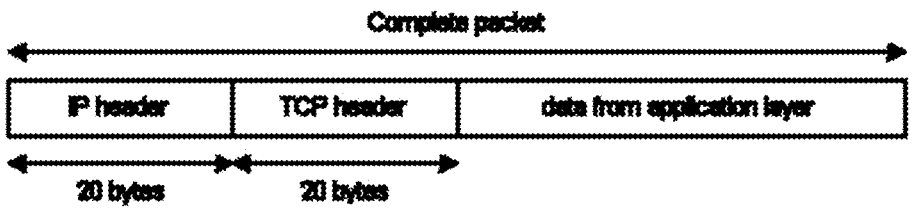
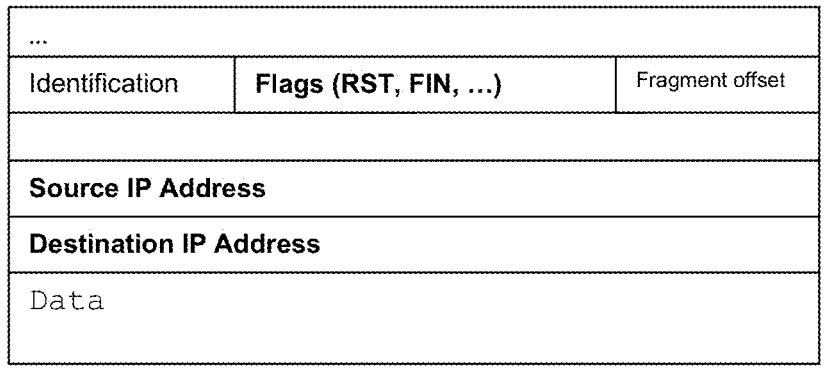
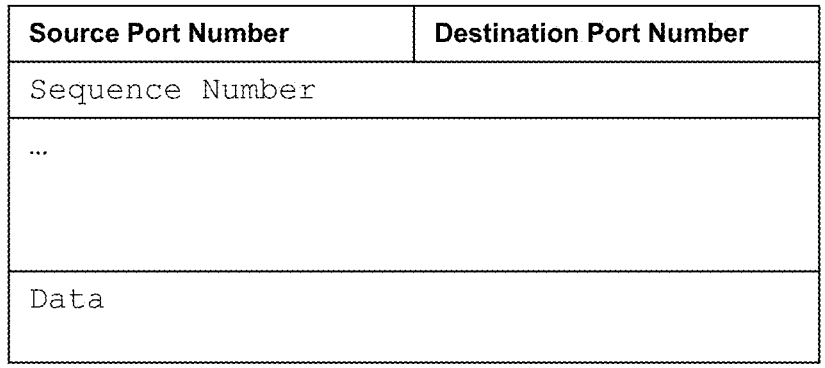
Figure 4 - TCP/IP Packet

Psuedo code for Inbound Process

Register with FWPM_LAYER_INBOUND_TRANSPORT_V4 by use FwpsCalloutRegister
.
//Intercept a data packet
pPacket=NdisGetDataBuffer(packet,NET_BUFFER_DATA_LENGTH(packet),pFlatBuffer,1,0);

//Assigned Current packet to previous packet
previousPacket = pPacket;

//Retrieve Next NIC's Source IP Address
PIP_ADAPTER_ADDRESSES nextSIP = NextSIP(pPacket->SourceIPAddress);

```
while(packet !=NULL)
{
    // get tcp header
    tcpHeader=NdisGetDataBuffer(packet,inMetaValues->transportHeaderSize,NULL,1,0);
    //Move Offset to TCP data
    NdisAdvanceNetBufferDataStart(packet,inMetaValues->transportHeaderSize,FALSE,NULL);

// check for error in transmission
    If (tcpHeader->FIN == notset or tcpHeader->RST == reset)
    {
        //Assigned the same nextSIP to packet with the same SourceIPAddress
        If (pPacket->SourceIPAddress == previousPacket->SourceIPAddress)
        {
            //Clone the packet and modify the tcp header Source IP Address
            status = FwpsAllocateCloneNetBufferList0(netBufferList,NULL,NULL,0,&clonedNetBufferList);

Inject data back into the datastream by use FwpsInjectTransportSendAsync
        }
        Else
        {
            //Assigned Current packet to previous packet
            previousPacket = pPacket;
            //Retrieve Next NIC's Source IP Address
            PIP_ADAPTER_ADDRESSES nextSIP = NextSIP(pPacket->SourceIPAddress);
            //Clone the packet and modify the tcp header Source IP Address
            status = FwpsAllocateCloneNetBufferList0(netBufferList,NULL,NULL,0,&clonedNetBufferList);

Inject data back into the datastream by use FwpsInjectTransportSendAsync
        }
    }
    packet=packet->Next;
}
```

Figure 7C

SIMULTANEOUS OPERATION OF A NETWORKED DEVICE USING MULTIPTLE DISPARATE NETWORKS

CROSS-REFERENCE TO RELATED APPLICATIONS

This application claims the benefit of U.S. Provisional Patent Application No. 61/354,326, filed on Jun. 14, 2010. The subject matter of the earlier filed application is hereby incorporated by reference in its entirety.

FIELD OF THE INVENTION

This invention relates to a system, method, and computer program for simultaneous operation of a networked device using two or more disparate networks.

BACKGROUND OF THE INVENTION

Many people use networked capable devices, which can be used to process network data packets, and a include personal computer, a laptop, a net book, a cellular phone, a smart phone, an music player, an electronic book enabled device and any device including a processor and memory that can receive and/or transmit information. The data packets are sent from any local area network hub, such as a switch, or router capable of using a wired connection or from a wireless network router, switch, hub, or as well from a network interface for a radio signal. The wired or wireless hub sends the data packets to a network interface controller (NIC) residing on the networked capable device. A NIC is computer hardware component designed to allow computers to communicate over a computer network. It allows users to connect to each other either by using cables or wirelessly. A networked capable device sends/receives data packets via a NIC to/from a network hub. It would be beneficial for the user of a networked capable device to simultaneously send and receive data packets from more than one wired or wireless network hub, in order to maximize the amount of network data packets the networked capable devices can send and receive, and in order to selectively and/or dynamically determine which network to use in case of network routing failure or based on type of content being receive or transmitted by the networked capable device. For example, a web browser of a network capable device is requested to retrieve the content of a web page from a web server via the wireless NIC, and a gaming application is sent instructions to a game server via the wired NIC to maximize network data flow. Another example is an email application is sent mail to the mail server via the wired NIC but it failed, the invention would re-route the message via wireless NIC.

SUMMARY OF THE INVENTION

The present disclosure allows a networked capable device simultaneous access to wired and/or wireless network hubs via the wired and wireless NICs. A Routing program, will reside on a networked capable device that will intercept the data packet streams from all active network interface devices attached or embedded in the device and route the packets to and from the appropriate active applications in the device.

In one embodiment of the disclosure, a Routing program would retrieve all Source IP Addresses associated with all available NICs in a device, examine the Source IP Addresses from the request data packets of a client application, web browser for example, and then routes the data packets, request, via the best available route. The best available route can be the default routing from the routing table based on the Source IP Address or the modified route by the Routing program.

BRIEF DESCRIPTION OF THE DRAWINGS

The disclosure will now be described with reference to specific embodiments and to the accompanying drawings in which:

FIG. 2 shows the Routing program running on top of NICs driver to make decision on which NIC and Route to send data packets;

FIG. 3 shows the location of Routing program in OSI (Open System Interconnection) Model;

FIG. 4 shows an un-detailed version of TCP/IP data packet diagram with all invention's relating variables highlighted;

FIG. 7A-C illustrates how the invention routes the data using the Routing program and describes the Routing program functions including pseudo code for each function;

DETAILED DESCRIPTION OF THE INVENTION

Figure 1:
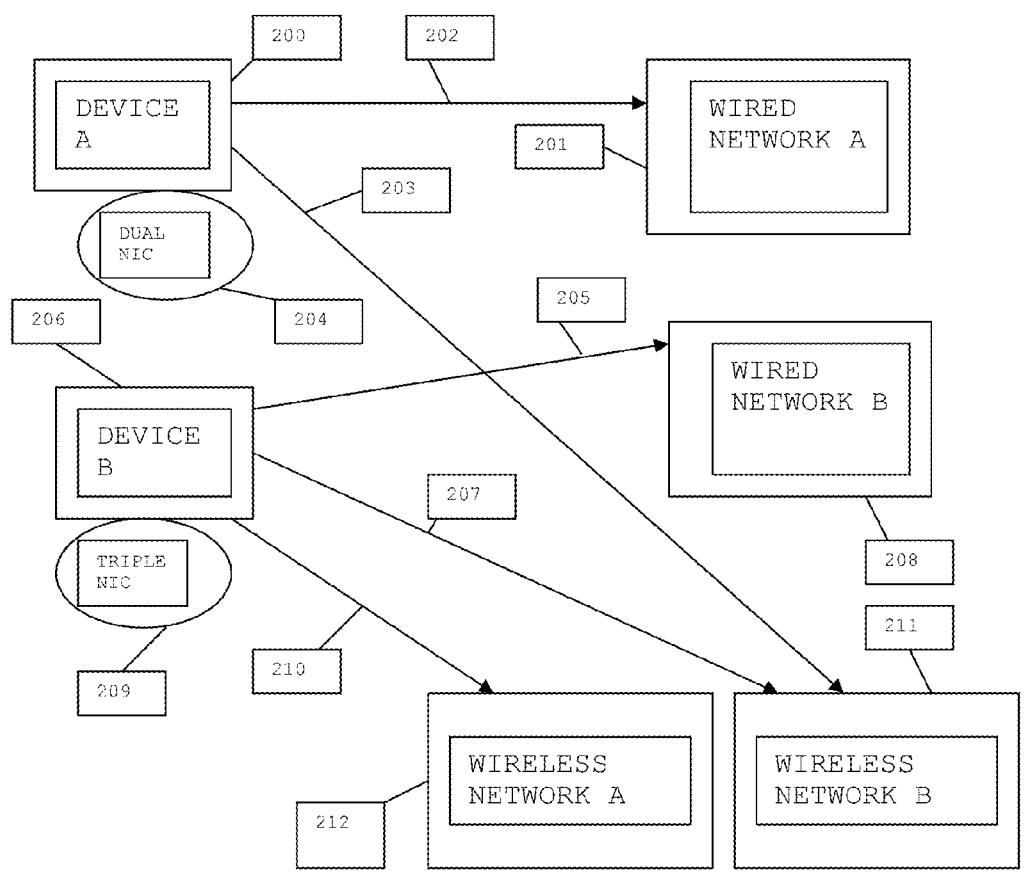
FIG. 1 illustrates a system for a networked capable device to send/receive data packets to/from multiple wired or wireless network controller.

A system in accordance with an embodiment of the disclosure is depicted in FIG. 1. In the system shown in FIG. 1, a networked capable device 200 is connected to a wired network hub 201 using a cable such as a Cat 6 202 or other cable connection 202. A Cat-6 is a cable standard for Gigabit Ethernet and other network protocols. The networked capable device 200 is also connected to a wireless network hub 211 using a wireless connection such as an 802.11b radio signal 203 or other radio signal. IEEE 802.11 is a set of standards carrying out wireless local area network (LAN) computer communication in the 2.4, 3.6 and 5 GHZ frequency bands. In FIG. 1, dual network interface controllers 204 are provided for a networked capable device 200 in order to send and receive data packets from a wired network hub 201 and a wireless network hub 211.

A networked capable device 206 is connected to a wired network hub 208 using a cable such as a Cat 6 205 or other cable connection. The networked capable device 206 is also connected to two wireless network hubs 211 and 212 using wireless connections such as an 802.11b or other radio signal 207. Three network interface controllers 209 are provided for the networked capable device 206 in order to send and receive data packets from a wired network hub 208 and the wireless network hubs 211 and 212.

When a user is using a networked capable device of the present disclosure, it may be desirable to send and receive data packets to and from two or more wired and/or wireless network hubs in order to, for example, increase the number of data packets the networked capable device can send and receive to and from multiple applications run on the networked capable device. This is achieved by having a Routing program on a networked capable device that intercepts the data packet streams to any active network interface controllers that are attached or embedded in the device. The Routing Program can be installed in the networked capable device as a 3$^{rd}$ party software or be part of an operation system. In Windows Operating System, the Routing Program can run as a Windows Service and it would start automatically when the networked capable device starts up. A Windows Service in a Windows Operating System is a long-running application that does not have a Graphical User Interface or produce any visual output. The Routing program would intercept, modify if necessary, and route the packets to and from the appropriate active applications in the device.

The Routing program is a system program running above the Device Driver layer to query all available Source IP Address associated with the NICs in a device. FIG. 2 shows the position of Routing program in a typical Operating System layers.

In order to comply with the rules of networking for all systems to be able to communicate, FIG. 3 shows the Routing program location in Open Systems Interconnection (OSI) model. It is in the Transport Layer of the OSI model. The Routing program intercepts data packets, determines the Source IP Address to route the data packets and re-inject the modified data back into the Transport layer. The Transport layer manages end to end message delivery in a network and also provides the error checking and recovery of data in the data transfers across the network. Then, the Network layer translates the Source or Local IP Address into MAC address and routes the data packets to the Destination IP Address. According the figure, the NIC device driver would fall between the Network and Data Link layers of the OSI model. The NIC is the Data Link and Physical layer of the OSI model.

FIG. 4 shown the data packet diagram with data that the Routing program needed for processing. The Source IP Address of the sending application is used to determine which available NIC to send the data to the network. The Source Port Number is used to determine which application sends the request and receive the response. The FIN and RST flags are used to determine if the request data is routed to the Destination IP Address and Destination Port Number of the receiving computer.

In accordance with an embodiment of the disclosure, the Routing program intercepts data packets from the device's application, modify the routing if needed, and route the data to the destination. These operations can be accomplished by examine the data packets and modify if needed the Source IP Address that represents the device's NIC using the operating system provided Kernel APIs. For Windows OS, the Windows Filtering Platform (WFP), and IP Helper APIs can be used to achieve the tasks. WFP is a low-level Kernel-Mode Filtering Engine to examine, filter and modify outgoing and incoming data packets. It is used by 3$^{rd}$ party anti-virus, parent control, firewall software to inspect inbound and outbound data packets. IP Helper is to retrieve information about the network configuration of the local computer and able to modify that configuration including the IP route entry.

Figure 5:
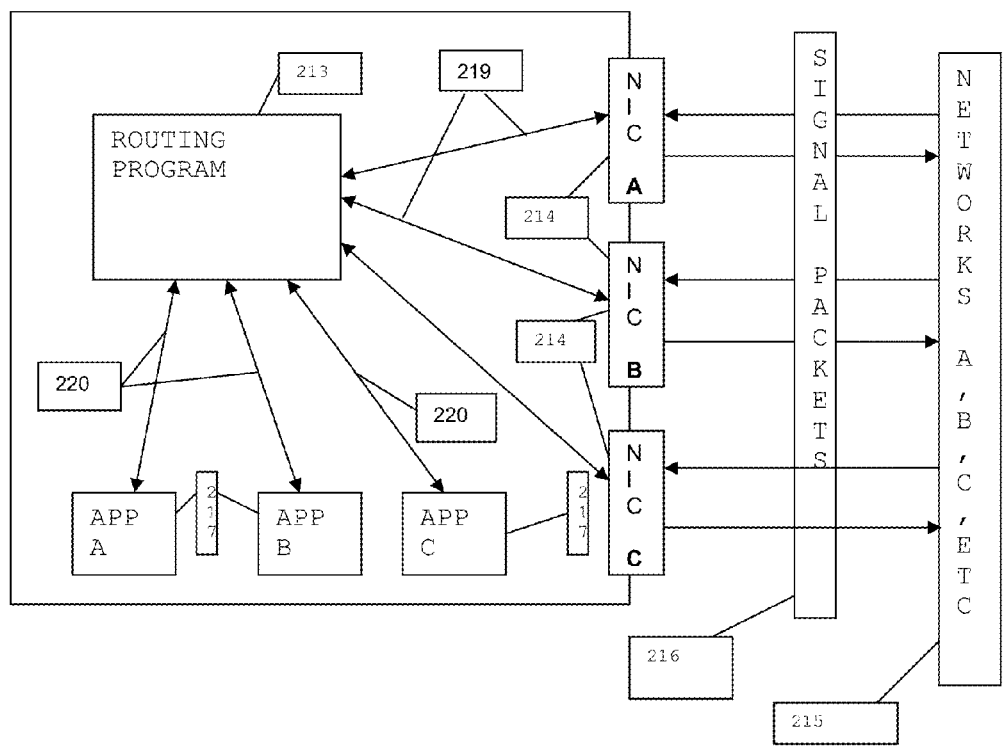
FIG. 5 illustrates an example for a networked capable device having three NICs simultaneously send network data packets to 1, 2 or 3 wired or wireless network hubs.

During the use of multiple applications that send and receive data packets on a networked capable device 200 or 206, it may be desirable to send and receive packets from two distinct wired and/or wireless network hubs, as illustrated in FIG. 5. For example, a web browser, Application App A 217, sends a request to retrieve the content of a web page from a web server. The Routing program 213 intercepts request from the Application App A 217, exams the Source IP address, modify the Source IP Address to NIC A 214 if it is not belonged to NIC A 214, and re-inject the request packets back into the Transport layer for the routing via NIC A 214 to the network hub 215. The Routing is based on the Source IP Address routing in the routing table. The wired or wireless network hub A 215 receives response data packets 216 to the NIC A 214. The NIC A 214 send the response data packets 216 to the application A 217 on the networked capable device that send and receive data packets.

Another scenario is a Routing program 213 intercept request packets from Application App B 217, exams and modifies if needed the Source IP address to match the one on NIC B 214, and re-inject the request packets back into the Transport layer for routing to the network hub B 215. However, if the data packets unable to route to the Destination IP Address because of network failure. For example, the NIC B 214 goes bad or the network hub B 215 loss of power, the Routing program will modify the data packets Source IP Address to the next available NIC, NIC C 214, then route the data packet based on the routing of the new Source IP Address. Since the Routine program is locating in the Transport layer, it has access to the acknowledgement of the successful data transmission and error checking of data packets for the case of network failure. If the network routing via NIC C 214 is unsuccessful then the Routing program 213 will modify the data packet's Source IP Address to NIC A 214's IP Address and use its routing. If the network routing via NIC A 214 is unsuccessful then this networked capable device is unable to communicate to the external network or isolated.

Figure 6:
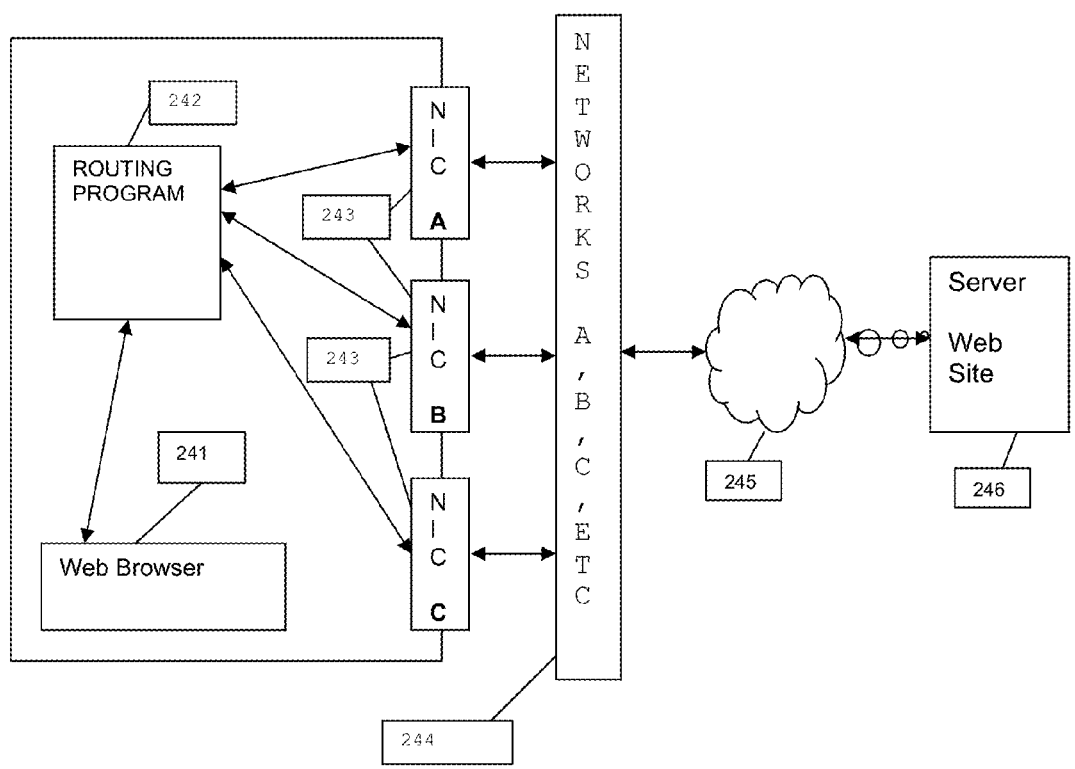
FIG. 6 illustrates an example of a web browser send a request and receives response to and from a web site using the invention.

In the example illustrated in FIG. 6, a web browser 241 is request to retrieve the content of a web page from a Web Server 246 where the web browser device 240 has the Routing program 242 installed and running. As the Web Browser 241 issue the request packets to the destination IP address, the Routing program 242 intercept the data packets in the Transport Layer, modify the Source IP Address to the IP Address of NIC A 243, and re-inject the modified packet back into the Transport layer. The data packet would routeto Network A 244 via NIC A 243 using the routing in the routing table for NIC A 243 IP Address. The routing table in Network A 244 directs the request data packets to the next hop or the next router in the external network 245 until the request data packets get to web site 246. For Windows Vista Operating System or later, WFP APIs can be use to register or hook in FWPM_LAYER_OUTBOUND_TRANSPORT_V4 layer of TCP Packet Flows to retrieve and modify the request data packet. The modification is done by clone the original packet, modifies the copied packet, drops the original packet and re-injects the copied back into the registered layer. The FWPM_LAYER_OUTBOUND_TRANSPORT_V4 layer is the Transport Layer that the WFP filter engine traversed during a typical TCP session. If the request from the web browser 241 fails to route to web site 246 by inspecting TCP flags of the incoming packet, Inbound Process, at the Transport layer based on the Source IP Address, the Routing program 242 will change the Source IP Address to the next available local IP Address of NIC B 243 that retrieve by the Routing program at start up, and re-inject the failure packet back into the data stream at the Outbound Transport Layer Based on the routing of the new Source IP Address of NIC B 243, the modified request packet will get route to Network B 244, then to the web site 246. This allows continuous transmission and receipt of packets regardless of failure in one NIC or/and Network Hub or/and a specific route to the web site.

Figure 7A:
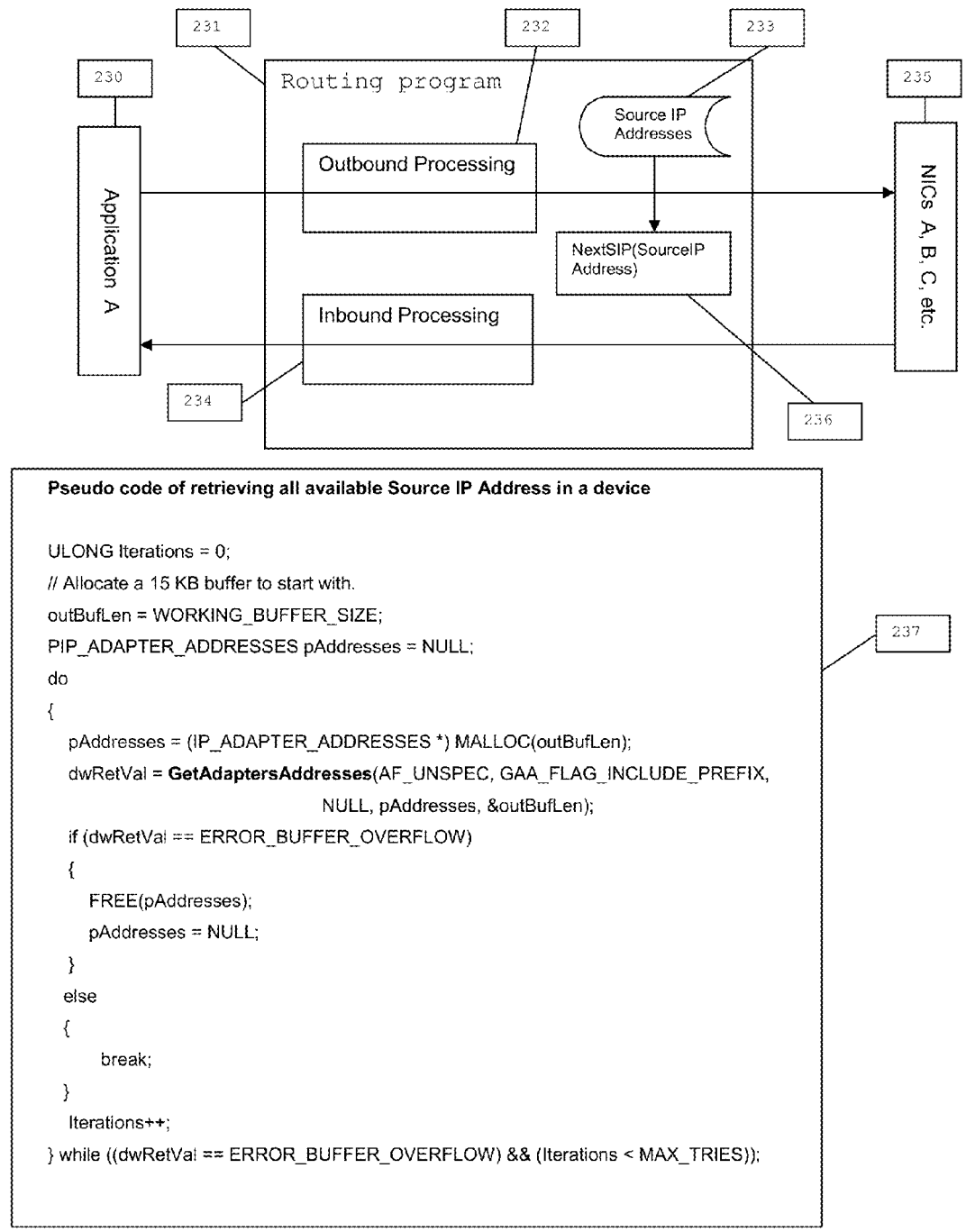
Figure 7B:
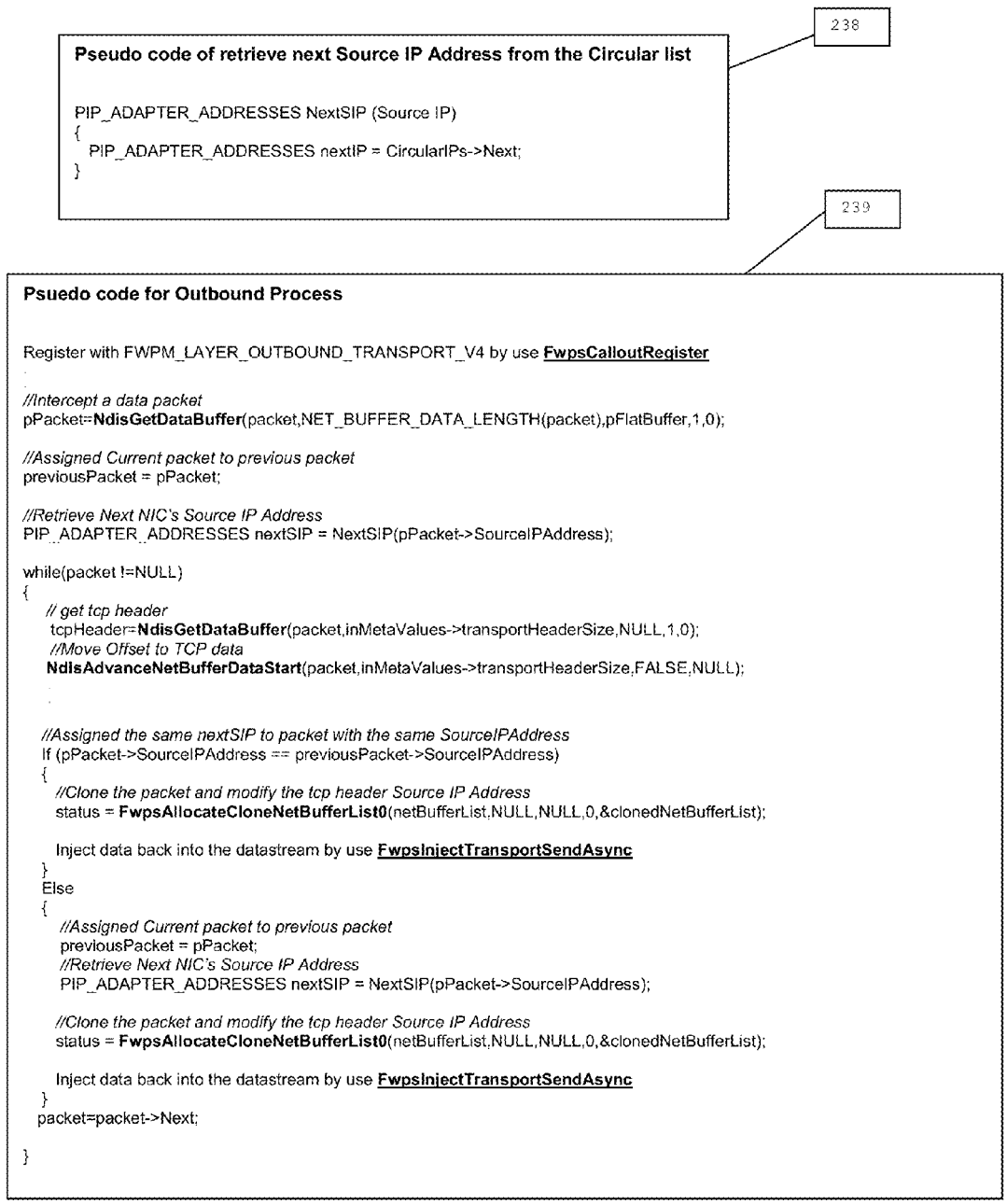

FIG. 7A-C shows a flow diagram of the Routing program 231. The Routing program retrieves all Source IP Addresses associated with all available NICs in a network capable device and saves them in memory or a Circular list for later access by the Outbound Process 232 and Inbound Process 234. In Windows Operating System, the retrieval of the Source IP Address can be accomplished by using the IP Helper API, GetAdaptersAddresses. Psuedo code segment using IP Helper API to retrieve available Source IP Addresses that associates with the NICs in a device is at 237. Psuedo code for function NextSIP 236 returns the next available Source IP Address in the Circular list 233 is at 238. The Outbound Process 232 registered with FWPM_LAYER_OUTBOUND_TRANSPORT_V4 layer when Routine program start up. It intercepts request data packets from Application A 230, saves the intercepted data packet as Previous packet, and call function NextSIP 236 to retrieve the Next Source IP Address. If the request data packet Source IP Address is match with the Previous packet's Source IP Address, the Outbound Process 232 clones the original request packet, modifies the copied packet with the Source IP Address from NextSIP function, drops the original packet and re-injects the copied back into the Transport layer. The checking of the packet's Source IP Address and the Previous packet's Source IP Address is to make sure that all packets with the same Source IP Address are assigned to the same NextSIP function's Source IP Address. If the request data Source IP Address is not match with the Previous packet's Source IP Address, the Outbound Process 232 call the NextSIP function to get the next available Source IP Address from available NICs, saves the request data packet as a Previous packet, and clones the original packet, modifies the copied packet with the Source IP Address from NextSIP function 236, drops the original packet and re-injects the copied back into Transport Layer. The pseudo code segment using WFP API for the Outbound Process 232 is shown in 239. Once the modified packet injected back into the data stream, it travels to NIC A 235 and route to the network. The Inbound Process 234 registers with the FWPM_LAYER_INBOUND_TRANSPORT_V4, intercepts the response data packets from NIC A 235 while the data is route back to Application 230 by the Source Port Number, saves it as a Previous packet, calls function NextSIP 236 to retrieve the next available NIC's Source IP Address. The Inbound process checks the response TCP flags for acknowledgement of the successful data transmission. If there is any error, the Inbound Process checks for the same Source IP Address from the Response packet with the Previous packet, modify the response data packet to the Source IP Address from function NextSIP 236, clear the TCP flags and re-inject the modify packet into the Outbound Transport Layer to route to the Destination via NIC B 235. The pseudo code segment using WFP API for Inbound Process is shown in 240.

For Windows 7 Operating System and later, Microsoft offers new WFP layers for easy redirect IP packets without clone, drop, modify, and re-inject every data packets from the existing Transport Layer. In the OSI model, the new WFP layers would be located in the Session Layer where the communication is established between devices. It is a "Pre-Connect" layers that allow to do Bind Redirect and Connect Redirect. Bind Redirect, FWPM_LAYER_ALE_BIND_REDIRECT_V4(V6), controls the connection between the application and Destination IP Address. Once the bind request is modified, the new Source IP Address will be bound to the socket until it is closed by the Application or the connection failure because of network bouncing. The Connect Redirect, FWPM_LAYER_ALE_CONNECT_REDIRECT_V4(V6), controls the current data packets send by the Application. The modification of the Source IP Address only affects the current flow and will not alter the Application socket connection. With the new features, the Routing program can run in the Session Layer of the OSI model instead of the Transport Layer to modify the connection Source IP Address instead of the routing data packets. The Bind Redirect function can be use to alter the Application socket connection to the Destination IP Address and Port number with another available Source IP Address to use different routing. The Routing program also uses FWPM_LAYER_ALE_FLOW_ESTABLISHED_V4(V6) to check for successful IP connection to the Destination IP Address. The checking of IP connection is to notify the Routing program of connection failure via the existing NIC and need to change to a different Source IP Address that associated with another NIC in a device.

Figure 8:
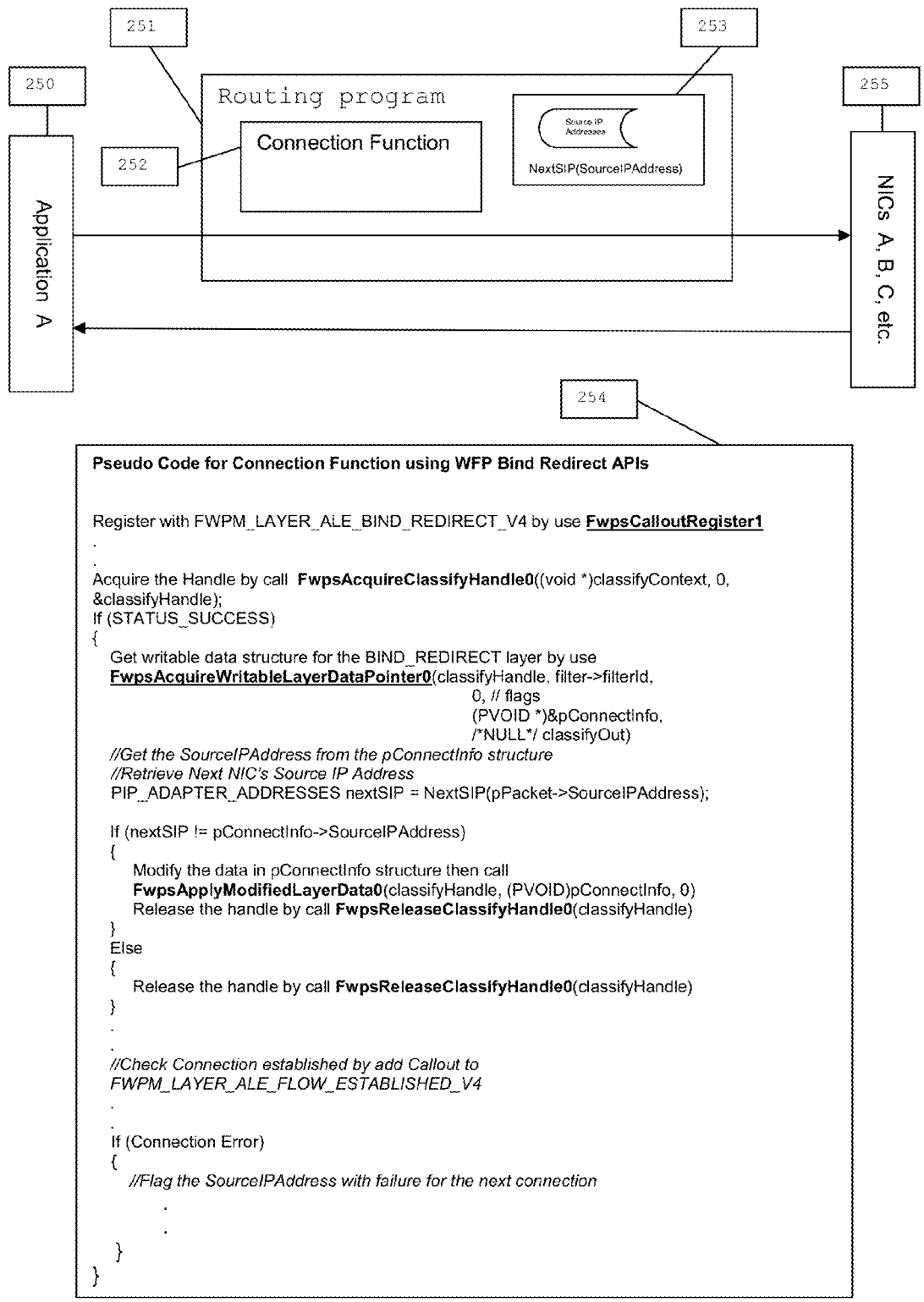
FIG. 8 illustrates how the invention routes the data using a new Routing program and describes the Routing program and describes the Routing program functions including pseudo code for each function.

FIG. 8 shows the new Routing program 251 with Connection Function 252, and the pseudo code segment for the new function 254. The Connection Function 252 registers with FWPM_LAYER_ALE_BIND_REDIRECT_V4 for 32-bit IP address or FWPM_LAYER_ALE_BIND_REDIRECT_V6 for 128-bit IP address, obtains a handle to the BIND REDIRECT LAYER that will be used in modify function calls, modifies the Source IP Address based on if the connection request Source IP Address is the different from the next available Source IP Address from the NextSIP function 253, and releases the handle that obtained in from previous 2 steps. Then, the function check for connection established by look at the FWPM_LAYER_ALE_FLOW_ESTABLISHED_V4 layer for successful status code. If the IP connection failed, an error flag with the failed Source IP Address is saved. The next IP connection from an application 250 is check for the failed Source IP Address and replaces it with the next available Source IP Address from the NextSIP function 253.

The current invention provides at least the following:

A networked capable device capable of simultaneous sending and receiving data packets to and from multiple wired and/or wireless network hubs.

A networked capable device capable of selectively and/or dynamically determine which NIC to send data packets in the case of network failure from one or multiple NICs and/or Network Hub.

The system and method in claim 1 where the network connections are one or more of the following: infrared, Bluetooth, radio, LAN, WAN, or any other IP enabled access to the Internet.

I claim:

1. A method of application updating on a network device, the method comprising:
   executing at least one application on the network device;
   retrieving all available network connections to the network device;
   transmitting a request for an update responsive to the at least one application execution via at least one of the available network connections;
   receiving a response indicating that the update is available;
   transmitting a confirmation request requesting the update;
   wherein the network device utilizes at least two network adapters and the first network adapter is configured for transmitting the request for update data, via a first network connection, and the second network adapter is configured for transmitting the confirmation request, via a second network connection;
   wherein the second network connection is a faster data connection than the first network connection;
   executing at least two applications;
   checking for update data for the at least two applications via the first network connection; and
   downloading the update data for the at least two applications via the second network connection.

2. The method of claim 1, wherein retrieving all available network connections from the network device comprises retrieving signal strengths of all available networks, and wherein an available network having a greatest signal strength is used for transmitting the request for an update.

3. The method of claim 1, wherein a first network adapter of at least two network adapters of the network device is used for receiving the response and transmitting the confirmation request.

4. The method of claim 1, wherein executing the at least one application on the network device further comprises invoking the application on a separated thread.

5. A network device configured to perform application updating, the apparatus comprising:
- a processor configured to execute at least one application on the network device and to retrieve all available network connections to the network device;
- a transmitter configured to transmit a request for an update responsive to the at least one application execution via at least one of the available network connections; and
- a receiver configured to receive a response indicating that the update is available;
- wherein the processor is further configured to transmit a confirmation request requesting the update;
- wherein the network device utilizes at least two network adapters and the first network adapter is configured to transmit the request for update data, via a first network connection, and the second network adapter is configured to transmit the confirmation request, via a second network connection;
- wherein the second network connection is a faster data connection than the first network connection; and
- wherein the processor is further configured to execute at least two applications and check for update data for the at least two applications via the first network connection, and the receiver is configured to download the update data for the at least two applications via the second network connection.

6. The network device of claim 5, wherein all available network connections are retrieved from the network device by retrieving signal strengths of all available networks, and wherein an available network having a greatest signal strength is used to transmit the request for an update.

7. The network device of claim 5, wherein a first network adapter of at least two network adapters of the network device is used to receive the response and transmit the confirmation request.

8. The network device of claim 5, wherein the at least one application being executed on the network device further comprises the application being invoked on a separated thread.

9. A non-transitory computer readable storage medium configured to store instructions that when executed cause a processor to perform application updating, the processor being further configured to perform:
- executing at least one application on the network device;
- retrieving all available network connections to the network device;
- transmitting a request for an update responsive to the at least one application execution via at least one of the available network connections;
- receiving a response indicating that the update is available; and
- transmitting a confirmation request requesting the update;
- wherein the network device utilizes at least two network adapters and the first network adapter is configured for transmitting the request for update data, via a first network connection, and the second network adapter is configured for transmitting the confirmation request, via a second network connection;
- wherein the second network connection is a faster data connection than the first network connection;
- wherein the executing the at least one application on the network device further comprises:
- executing at least two applications;
- checking for update data for the at least two applications via the first network connection; and
- downloading the update data for the at least two applications via the second network connection.

10. The non-transitory computer readable storage medium of claim 9, wherein retrieving all available network connections from the network device comprises retrieving signal strengths of all available networks, and wherein an available network having a greatest signal strength is used for transmitting the request for an update.

11. The non-transitory computer readable storage medium of claim 9, wherein a first network adapter of at least two network adapters of the network device is used for receiving the response and transmitting the confirmation request.

* * * * *

UNITED STATES PATENT AND TRADEMARK OFFICE
CERTIFICATE OF CORRECTION

PATENT NO.         : 8,893,113 B1                                  Page 1 of 1
APPLICATION NO.    : 13/159506
DATED              : November 18, 2014
INVENTOR(S)        : Kevin V. Nguyen It is certified that error appears in the above-identified patent and that said Letters Patent is hereby corrected as shown below:

On the Title Page, Item (54) and in the Specification, Column 1, Line 2, please correct the spelling in the title as follows:

--Multiptle-- should be "Multiple"

Signed and Sealed this
Twenty-eighth Day of April, 2015

Michelle K. Lee
*Director of the United States Patent and Trademark Office*